Sept. 2, 1941.  W. F. ALLER  2,254,259
GAUGING DEVICE
Filed June 19, 1940
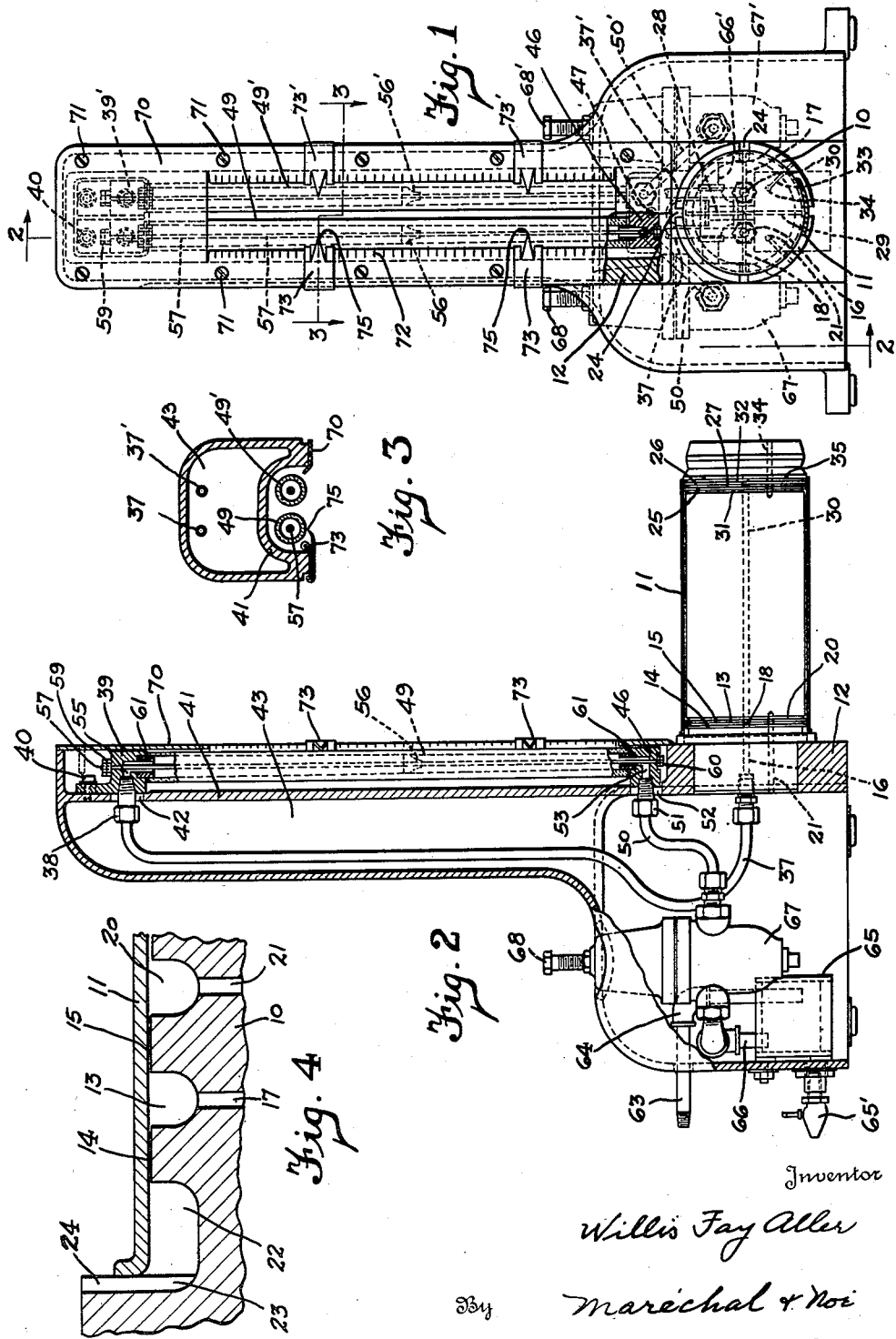
Inventor
Willis Fay Aller
By Maréchal & Noé
Attorney Patented Sept. 2, 1941

2,254,259

UNITED STATES PATENT OFFICE 2,254,259

GAUGING DEVICE

Willis Fay Aller, Dayton, Ohio, assignor to The Sheffield Corporation, a corporation of Ohio Application June 19, 1940, Serial No. 341,347

5 Claims. (Cl. 33—178).

This invention relates to gauging devices for determining the size or form of a workpiece or the like.

One object of the invention is the provision of a gauging device employing fluid flow through a leakage path between the workpiece and a gauging element to determine a dimension of the workpiece by comparison with a standard part, with means for accurately determining the rate of leakage, the construction being such as to give a substantially instantaneous measurement or indication when the workpiece is applied to the gauging element.

Another object is the provision of a gauging device embodying a gauging element adapted for cooperation with a workpiece to be gauged to provide a fluid leakage path that is variable in size in accordance with the fit of the workpiece, the gauging element having an associated measuring device operable in accordance with the rate of leakage of fluid supplied under constant pressure and passing through the leakage path.

Another object is the provision of a gauging device in which a gauging element interfits with a workpiece to be gauged and provides a fluid leakage path variable in size in accordance with the fit of the workpiece, and an associated rate of flow indicator of simple construction and operating under a constant fluid pressure supply so that the size of a part being gauged can be quickly compared to a workpiece of standard size.

Another object of the invention is the provision of a gauging device of the character mentioned in which the leakage between the gauging element and the workpiece is measured by a tapering conduit having a movable element positioned in accordance with the rate of flow through the conduit and operable in response to variations in the rate of fluid flow through the conduit for indicating the deviation of a workpiece being gauged from an acceptable size standard part.

Another object is the provision of a gauging device of the character mentioned including a plurality of adjacent indicating devices having means responsive to variations in the rate of flow and having independent connections to leakage passages the size of which are variable in accordance with the fit of different workpiece surfaces, there being provision for adjusting the pressure of the fluid supplied to each of the conduits and for maintaining the fluid pressures at constant values.

Other objects and advantages of the invention will be apparent from the following description, the appended claims, and the accompanying drawing, in which:

Fig. 1 is a front elevation of a gauging device embodying the present invention;

Fig. 2 is a side elevation of the device, with a portion shown in section;

Fig. 3 is a horizontal section on the line 3—3 of Fig. 1; and

Fig. 4 is an enlarged sectional view through a portion of the workpiece and an associated part of the gauging element.

The drawing shows the preferred embodiment of the invention in a gauging device for comparing or measuring the dimension of a surface on a workpiece to be checked. Referring more particularly to the drawing, in which the same reference numerals have been used to designate like parts in the several views, the gauging device incorporates a gauging element 10 adapted to receive a workpiece in interfitting engagement with it. The gauging element as herein shown is of generally cylindrical form and adapted to measure the internal diameter of a tubular workpiece 11, although of course the gauging element may take various forms in accordance with the character of the surface of the workpiece to be gauged. The gauging element, which is detachably mounted on a supporting frame 12, is provided with an annular groove 13 on both sides of which are finished cylindrical surfaces 14 and 15 of known diameter slightly less than the diameter of a standard size workpiece so that the workpiece may be readily applied to the gauging element. A fluid passage 16 of substantial diameter extends from one end of the gauging element and communicates with branch passages 17 and 18 leading out to and communicating with the groove 13 so that air or other suitable fluid can pass through the passage 16 and out through the passages 17 and 18 to the groove, and will leak between the gauging surfaces 14 and 15 and the inside surface of the workpiece 11. The size of the leakage path is thus determined by the fit of the workpiece and if the workpiece is slightly larger than a desired dimension a greater amount of leakage will take place than that occurring if the workpiece is smaller. The leakage fluid passing over the gauging surface 15 travels through a groove 20 which communicates with an exhaust passage 21, and the leakage fluid passing over the surface 14 enters a groove 22 and is exhausted from an annular groove 23 which communicates with radially extending slots 24 leading to the atmosphere.

The particular gauging element shown is adapted to measure the diametrical distances at spaced points on the same workpiece. It is thus provided with a second pair of accurately finished gauging surfaces 25 and 26 separated by an annular groove 27 which is supplied with fluid pressure from branch passages 28 and 29 leading from an axially extending passage 30. The exhaust grooves 31 and 32 are respectively in communication with the atmosphere through passages 33, 34 and through passages 35. The diameter of the surfaces 25 and 26 may be the same or may be different from the diameter of the surfaces 14 and 15.

Connected to the passage 15 in the gauging element is a flexible pipe 37 the upper end of which is provided with a fitting 38 screwed in a block 39 which is detachably connected by means of a screw 40 to a vertically extending wall 41 of the support 12. The fitting 38 extends through an opening 42 in this wall, pipe 37 extending up along the rear side of the wall in a compartment 43 provided between the wall 41 and the rear wall 44.

Detachably connected to the lower portion of the wall 41 is a lower block 46, the connection being effected by a bolt 47 threaded into the wall 41. This block 46, together with block 39, forms a support for a transparent tube 49 of glass or other suitable material, which is vertically arranged in front of the wall 41 and forms a conduit to which fluid under pressure is supplied from a flexible tube or pipe 50 having a fitting 51 threaded into the rear side of the block 46 and extending through an opening 52 in the wall 41. This fluid enters the lower end of the conduit through a passage 53 in the block 46, and passes through the conduit, through the passage 55 in block 39, and through the fitting 38 and the pipe 43 which extends to the fluid passage 16 in the gauging element.

The glass tube 49 has an internal passage of gradually varying cross section, tapering downwardly from its upper end. Inside the glass tube is an indicating weight 56 having an external diameter substantially equal to or slightly less than the internal diameter of the tube at its smaller end. The weight 56 has an axial passage closely fitting for sliding movement on a guide rod 57 which extends centrally throughout the length of the conduit 49. The upper end of this rod extends through the block 39 and its projecting end is externally threaded and held in place by nuts 59. The lower end of the rod extends downwardly through an axial passage in the block 46 and is suitably tensioned by the nuts 60, the passages through the blocks 39 and 46 along which the rod extends being suitably sealed against fluid leakage. The nuts 59 and 60 serve to hold the glass tube clamped between the blocks 39 and 46, sealing washers 61 of rubber or other suitable material being employed at each end of the tube between the tube and the end blocks.

The pipe 50 is connected to a fluid pressure device, employing air or other fluid, so that it has a pressure above or below atmospheric pressure but different from that prevailing in the exterior space around the gauging instrument. A leakage flow of fluid is thus obtained past the gauging surfaces of the gauging element, between those surfaces and the surface of the gauging element to be compared or to be checked.

In the construction as herein shown air is supplied from pipe 50 at some constant pressure to the lower end of the conduit 49 and passes between the inner surface of the conduit and the outer portions of the weight 56 before it travels to the passage in the gauging element. The pressure of the air supplied through pipe 50 corresponds to the pressure in the lower end of the conduit 49, as the size of the passage 53 in block 46 is such as not to offer any substantial obstruction to free flow during a gauging operation. The pressure in the lower end of the conduit 49 is thus maintained constant in any gauging operation, and the amount of leakage taking place past the surface of the workpiece being gauged is indicated by the position of the weight 56, the weight being compelled to rise in the conduit to a height determined by the flow rate through the conduit which of course corresponds to the flow rate through the leakage path at the gauging element. While the actual rate of flow may not be known, the height to which the weight 56 rises along the tube when a workpiece is being checked can readily be compared to some normal position to which it rises when a workpiece of standard size is in place on the gauging element. The variation in positioning of the weight from such normal position for any given workpiece, gives an indication as to the amount of oversize or undersize of the surface being gauged. This indication is preferably a direct visual indication, as the position of the weight is apparent through the transparent wall of the conduit, although of course the position of the weight may be otherwise employed in a gauging or sizing operation.

The lower portion of the support 12 forms a housing carrying a pipe 63 adapted to be connected to a source of air pressure, pipe 63 extending to the pipe connection 64 leading to a liquid trap 65 arranged within the housing. The trap has a liquid relief valve 66 which may be opened from time to time to permit the discharge of any condensate. A pipe 66 extends from the trap to a pressure regulating valve 67 which in turn is connected at its discharge side to the pipe 50. The pressure regulating valve serves to maintain some constant pressure in the pipe 50. This pressure may be varied by adjustment of the screw 68 so that any desired pressure may be maintained below that existing in the supply line to which the pipe 63 is connected. By adjusting the screw 68 the device is adapted to check various workpieces with considerable variations in the amount of permissible tolerance, and permits the weight 56 to assume a normal position approximately halfway up the conduit to indicate that the workpiece is of the required size. When using a work engaging element of different size in place of the element 10, or for checking with various permissible tolerance ranges, the weight 56 may be removed and replaced by a heavier or a lighter weight. This replacement of the weight 56 is effected by removing the screws 40 and 47 and then removing the nuts 59 and taking the block 39 from the upper end of the tube and applying another heavier or lighter weight in place of the weight 56 before these parts are again reassembled.

If only a single measurement of a work surface is desired, only one conduit 49 is required. The gauging device shown, however, is provided with a pair of such conduits, one for each of the two fluid passages in the gauging element. The passage 30 which supplies fluid to the groove 27 is thus connected to a pipe 37' which extends to the block 39' on the upper end of the glass tube or conduit 49', the lower end of which is connected to the block 46 along side of conduit 49. The trap 65 is connected through pipe 66' to a pressure regulating valve 67' having an adjusting screw 68', the discharge side of the valve being connected through pipe 50' to the passage in the block 46 through which fluid is freely supplied to the conduit 49'. The two conduits 49 and 49' are arranged closely adjacent one another so that the weight 56' in the tube 49' may be viewed at the same time as one views the weight 56. Even though the permissible tolerance at one end of the workpiece may be far different from that at the other end, by suitable adjustment of the pressure regulating valves 67 and 67', the normal positions of the two weights, corresponding to the normal or desired sizes of the different portions checked on the workpiece, may be at the same level.

The upper portion of the housing is formed, as shown in Fig. 3, to provide a recessed portion in which the tubes 49 and 49' are vertically arranged. Partially covering the forward lateral portions and the upper and lower ends of this recess is a front plate 70, held in place by attaching screws 71 and preferably provided with scale markings 72. Slidably mounted for vertical movement on the side portions of this front plate are slidable index members 73 and 73' having pointed tongue portions 75 which project out in front of the centers of the tubes. They are adapted to be positioned in accordance with the level assumed by the weights when a standard part is in place on the work engaging element, to show the maximum or minimum permissible indication of a gauged workpiece. The pressures maintained by the pressure regulating valves are preferably so adjusted that the two weights are at the same level when the sizes checked at different portions of the workpiece correspond to an acceptable size standard. When a workpiece to be gauged replaces the standard part, one can readily determine, from the position of the weights in the conduits, whether or not the dimensions checked on the workpiece are in exact correspondence with the required size or whether the dimensions are too large or too small and approximately the amount of variation from the normal or required size.

The device is exceedingly accurate, as the weights 56 may be made light enough to show even very small variations in the rate of flow of the pressure fluid in a gauging operation, and there are very few working parts so that the device is capable of satisfactory operation over long periods of time. In a gauging operation the flow of fluid into the conduit in which the indicating weight moves takes place at constant pressure as no flow restricting orifice is interposed between the discharge side of the pressure regulating valve and the conduit. The length of the passage between the discharge end of the conduit and the gauging element may be quite long, as it is not a factor that would change the accuracy of the indications, since the restriction to flow offered by this passage is inconsequential in a gauging operation in which the leakage taking place between the workpiece surface and the finished measuring surfaces of the gauging element is the flow governing factor. The device, moreover, is such as to give an immediate measurement or indication when the workpiece is applied to the gauging element, as there is no appreciable time required for flow conditions to stabilize after the workpiece is applied. The flow rate past the weight is instantly changed to the flow rate through the gauging leakage path as soon as the workpiece is applied.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device of the character described comprising a gauging element adapted for interfitting engagement with a workpiece to be gauged, said element having a fluid passage for cooperation with the workpiece to provide a leakage path the effective size of which is varied by the fit of the workpiece, a conduit, means in substantially free communication with said conduit for supplying fluid thereto at a constant pressure, a controllable device for adjusting the pressure of the fluid in said means, said conduit having communication with said fluid passage, and means operable in said conduit longitudinally thereof to different positions of balance therein in response to variations in the rate of fluid flow through the conduit and independently of fluid pressure in the conduit for indicating deviation of a workpiece being gauged from an acceptable size standard.

2. A gauging device of the character described comprising a gauging element adapted for interfitting engagement with a workpiece to be gauged, said element having a fluid passage for cooperation with the workpiece to provide a leakage path the effective size of which is varied by the fit of the workpiece, a conduit having communication at one end with said fluid passage, a pressure regulating valve adapted for connection to a fluid pressure source and having a discharge passage in which a constant fluid pressure is maintained under varying conditions of the rate of flow, means placing the other end of said conduit in substantially free communication with the discharge passage of the pressure regulating valve, and means responsive to variations in the rate of fluid flow through the conduit for determining the deviation of a workpiece being gauged from an acceptable size standard.

3. A gauging device of the character described for comparing a workpiece to a standard part, comprising a gauging element adapted to interfit with a surface of the part to be compared and having a fluid passage for cooperation with the workpiece to provide a leakage path the effective size of which is varied by the fit of said surface, a vertical transparent tube having a passage of tapering cross sectional area and connected at one end to the fluid passage in the gauging element, means connected to the other end of the tube and in free communication therewith for supplying fluid to said tube under constant pressure, and gravity actuated means operable along the tube in a gauging operation by the flow of fluid through the tube to indicate, by its position in the tube, a comparison of the surface checked with a standard part.

4. A gauging device of the character described comprising gauging means adapted for interfitting association with a plurality of workpiece surfaces and having fluid passages cooperating with the workpiece surfaces to provide leakage paths the effective size of which are respectively varied by the fit of the surfaces, a plurality of closely adjacent conduits each communicating with a different fluid passage of the gauging means, a fluid pressure regulating valve for each conduit having its discharge side in free communication with its respective conduit, indicating means operable longitudinally of the conduits in accordance with the respective fluid flow rates, and means for independently adjusting said regulating valves to position the respective indicating means directly opposite one another for various differentials of flow rates.

5. A gauging device of the character described comprising gauging means adapted for interfitting association with a plurality of workpiece surfaces and having fluid passages cooperating with the workpiece surfaces to provide leakage paths the effective size of which are respectively varied by the fit of the surfaces, a plurality of upright closely adjacent conduits of tapering cross sectional internal area each communicating with a different fluid passage of the gauging means, means in free communication with each conduit for supplying fluid thereto at a constant value, indicating means in each conduit and longitudinally movable therein to different positions of balance in accordance with the rate of flow of fluid through such conduit independently of the pressure conditions of the fluid in the conduit for comparing fluid leakage past the gauged surface with the leakage when a standard part is employed, and adjusting means operable to relatively adjust the position assumed by said indicating means to give normal indications when the several indicating means are at the same level.

WILLIS FAY ALLER.